(12) United States Patent
Kowalchuk

(10) Patent No.: US 10,939,610 B2
(45) Date of Patent: Mar. 9, 2021

(54) AGITATION CONTROL SYSTEM FOR PARTICULATE MATERIAL

(71) Applicant: CNH Industrial Canada, Ltd., Saskatoon (CA)

(72) Inventor: Trevor Lawrence Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 303 days.

(21) Appl. No.: 16/045,238

(22) Filed: Jul. 25, 2018

(65) Prior Publication Data

US 2020/0029495 A1    Jan. 30, 2020

(51) Int. Cl.
*A01C 15/00* (2006.01)
*A01C 7/20* (2006.01)
*A01C 15/12* (2006.01)

(52) U.S. Cl.
CPC ............ *A01C 15/007* (2013.01); *A01C 7/206* (2013.01); *A01C 15/122* (2013.01); *A01C 15/124* (2013.01)

(58) Field of Classification Search
CPC ..... A01C 7/206; A01C 15/122; A01C 15/124; A01C 15/007
See application file for complete search history.

(56) References Cited

U.S. PATENT DOCUMENTS 5,831,542 A    11/1998 Thomas et al.
6,070,539 A *  6/2000 Flamme ............... A01C 21/005
                                                 111/177
7,171,913 B1   2/2007 Conrad
8,464,907 B2   6/2013 Ellingson et al.
8,504,211 B2   8/2013 Applegate et al.
8,950,260 B2   2/2015 Gelinske et al.
9,258,939 B2   2/2016 Borgmann et al.
9,591,800 B2   3/2017 Kowalchuk et al.
(Continued)

OTHER PUBLICATIONS

Case IH; "500T Air Drill"; Apr. 10, 2018, retrieved from: https://www.caseih.com/northamerica/en-us/products/planting-seeding/precision-disk-air-drills/500t (11 pages).
(Continued)

*Primary Examiner* — Anshu Bhatia
(74) *Attorney, Agent, or Firm* — Rebecca L. Henkel; Rickard K. DeMille

(57) ABSTRACT

A particulate material agitation control system includes a metering system and an agitation control system. The metering system includes a first meter at a first position of the metering system and a second meter at a second position of the metering system. The agitation control system an agitating system and a controller having a memory and a processor. The agitating system includes a drive system. The controller is configured to determine a first output amount of particulate material at the first position, determine a second output amount of the particulate material at the second position, determine whether a difference between the first output amount and the second output amount is greater than an output difference threshold value, and output an activation signal to the agitating system indicative of instructions to activate the drive system in response to determining that the difference between the first output amount and the second output amount is greater than the output difference threshold value.

19 Claims, 10 Drawing Sheets

(56) References Cited

U.S. PATENT DOCUMENTS

| | | |
|---|---|---|
| 9,839,177 B2 | 12/2017 | Kowalchuk |
| 2014/0000919 A1 | 1/2014 | Bachman et al. |
| 2016/0120097 A1* | 5/2016 | Chahley ............... A01C 21/005 |
| | | 701/50 |
| 2016/0302353 A1 | 10/2016 | Wendte et al. |
| 2017/0142895 A1 | 5/2017 | Henry |
| 2018/0024549 A1 | 1/2018 | Hurd |

OTHER PUBLICATIONS

Evergreen Implement; Apr. 10, 2018, retrieved from: http://evergreenimplement.com/Equipment/New-Equipment/Agriculture/Planting-amp;-Seeding/Planters/DB-Planter-Series/DB66-36Row22.aspx (29 pages).

* cited by examiner

AGITATION CONTROL SYSTEM FOR PARTICULATE MATERIAL

BACKGROUND

The present disclosure relates generally to an agitation control system for particulate material.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. These implements generally contain a particulate material, such as seeds, fertilizer, and/or other agricultural product, which is distributed on or in the ground using various methods. Certain implements include a storage tank in which the particulate material is stored and a metering system configured to meter the particulate material from the storage tank. The particulate material is distributed from the metering system to row units, which are configured to distribute the particulate material on or in the ground. As the storage tank is filled with the particulate material and/or while the particulate material flows from the storage tank to the metering system, the particulate material may create an undesirable profile within the storage tank. Several factors may contribute to this undesirable profile, including, but not limited to, friction between the particulate material and the storage tank, clumping of the particulate material, operation of the implement on a slope, and inactive meters of the metering system. This undesirable profile may lead to uneven flow to the metering system, which may cause an unwanted distribution or no distribution of the particulate material over certain regions of a field. As a result, the crop yield within these regions may be reduced, thereby reducing the efficiency of the seeding process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particulate material agitation control system includes a metering system and an agitation control system. The metering system includes a first meter at a first position of the metering system and a second meter at a second position of the metering system. The agitation control system an agitating system and a controller having a memory and a processor. The agitating system includes a drive system. The controller is configured to determine a first output amount of particulate material at the first position, determine a second output amount of the particulate material at the second position, determine whether a difference between the first output amount and the second output amount is greater than an output difference threshold value, and output an activation signal to the agitating system indicative of instructions to activate the drive system in response to determining that the difference between the first output amount and the second output amount is greater than the output difference threshold value.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
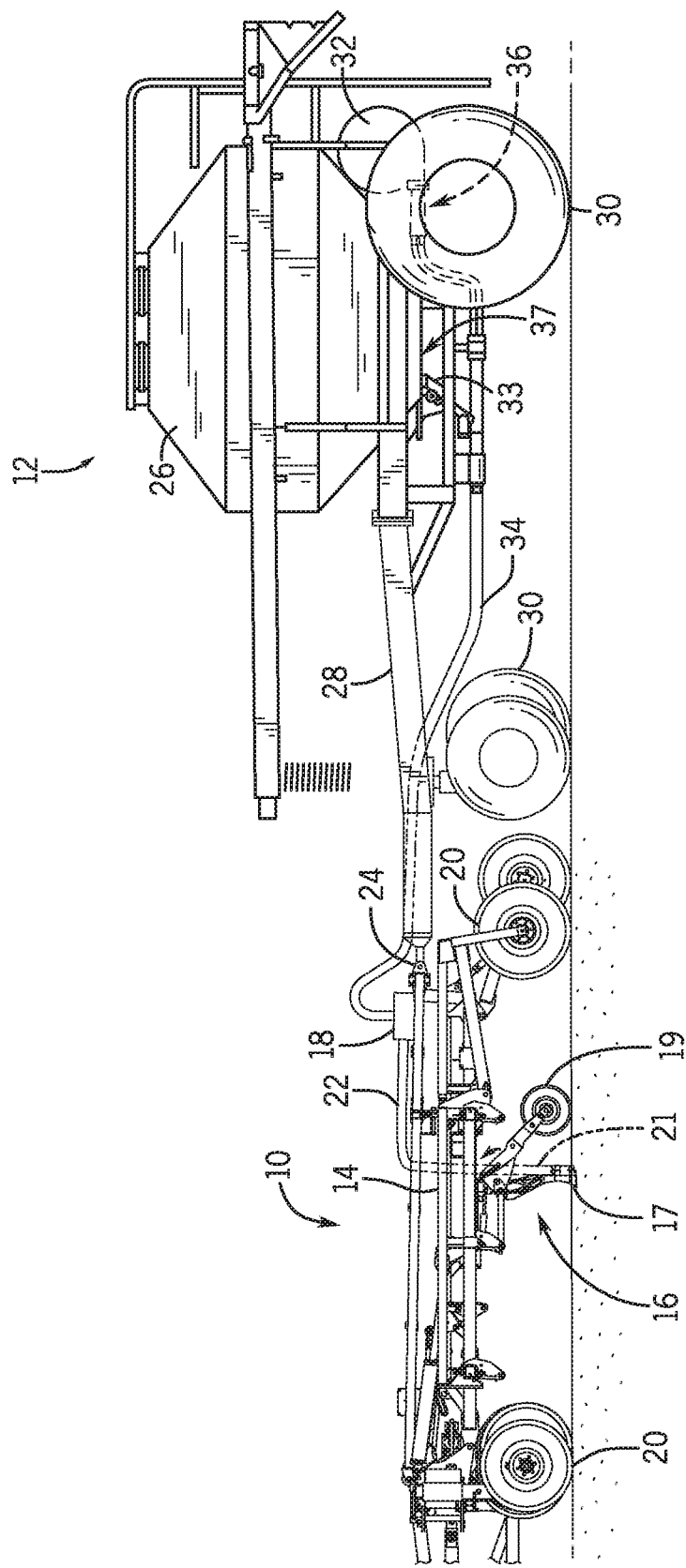
FIG. 1 is a side view of an embodiment of an agricultural implement coupled to an air cart.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particulate material agitation control system. Certain agricultural systems (e.g., air carts, implements, etc.) contain a particulate material (e.g., seeds, fertilizer, and/or other agricultural products) within a storage tank of the agricultural system. Certain agricultural systems are coupled to a respective implement and/or include tools (e.g., row units) configured to distribute the particulate material within a field. The particulate material may flow from the storage tank through a metering system, which is configured to control the flow of the particulate material to the field. As the storage tank is filled with the particulate material or as the particulate material flows from the storage tank through the metering system, the profile of the particulate material within the storage tank may change. Additionally, as particulate material is dispensed from the storage tank through a metering system having multiple meters, some meters of the metering system may be active while other meters are inactive, which may lead to variations in the profile of the particulate material within the storage tank.

Accordingly, in certain embodiments, a particulate material agitation control system includes a controller and an agitating system having at least one drive system. The controller is configured to determine a measured profile of the particulate material in the storage tank of the agricultural system based on one or more factors. Such factors may include a profile determined by sensors of the particulate material agitation control system, a profile determined by the amount (e.g., the output) of particulate material that is metered through individual meters of the metering system, a profile detected by a camera sensor disposed above the particulate material in the storage tank, or a combination thereof. The controller is configured to compare the measured profile to a target profile. The target profile may be based on the implement type, the particulate material being distributed, the operation being performed, the target distribution of the particulate material within the field, etc. The target profile may also be input by an operator or determined by the controller. If the controller determines that a variation between the measured profile and the target profile is greater than a profile variation threshold value, the controller outputs a signal to a user interface indicative of instructions to inform an operator of the profile variation. The controller may also output an activation signal to the agitating system indicative of instructions to move the particulate material to reduce the profile variation. In response, the drive system of the agitating system may move the particulate material.

In some embodiments, an agitation controller of the particulate material agitation control system is configured to receive signal(s) indicative of amounts of particulate material output by individual meters of the metering system. For example, the agitation controller may receive output signal(s) from a motor controller coupled to respective motors of a first meter and a second meter. A first motor may be coupled to the motor controller and to a first meter, and a second motor may be coupled to the motor controller and to a second meter. The first meter may be located at a first position along the metering system, and the second meter may be located at a second position along the metering system. The agitation controller compares the output amounts (e.g., compares a first output amount of the first meter at the first position with a second output amount of the second meter at the second position) and determines whether a difference between the output amounts is greater than an output difference threshold value. In response to determining that the difference is greater than the output difference threshold value, the agitation controller outputs a signal to the user interface indicative of instructions to inform the operator that the difference is greater than the output difference threshold value, and/or the agitation controller outputs an activation signal to the agitating system indicative of instructions to activate. Activation of the agitating system causes the drive system to move an agitator. As the agitator moves, the particulate material may move toward the position above the meter with a greater output amount. For example, if the output amount of the first meter is less than the output amount of the second meter, the agitator moves a portion of the particulate material from the first position toward the second position. As a result, the particulate material is moved toward the meter with the higher output amount, thereby increasing the efficiency of seeding operations.

In certain embodiments, the agitation controller and the motor controller of the particulate material agitation control system may be a single controller such that the controller may control the particulate material agitation control system and control individual motors of the respective meters. The controller may determine control values of the motors and respective meters (e.g., the controller may determine the output amount for each meter), and, based on the control values, may control the particulate material agitation control system. For example, the controller may determine a first output amount for a first meter and a second output amount for a second meter. The controller may output signals to motors coupled to the first meter and the second meter to cause the first meter to generate the first output amount and cause the second meter to generate the second output amount. The controller may also compare the first output amount and the second output amount and determine whether a difference between the output amounts is greater than an output difference threshold value. In response to determining that the difference is greater than the output difference threshold value, the controller outputs a signal to the user interface indicative of instructions to inform the operator that the difference is greater than the output difference threshold value, and/or the controller outputs an activation signal to the agitating system indicative of instructions to move the particulate material toward the meter with the greater output amount.

The output amounts of respective meters may also be used to determine a measured profile. For example, a first level may be determined based on the first output amount and a second level may be determined based on the second output amount. The controller may determine the measured profile based on the determined first level and the determined second level. The controller may compare the measured profile to a target profile and control the agitating system as described above.

In some embodiments, the controller of the particulate material agitation control system is configured to receive signal(s) from a camera sensor positioned generally above the agitating system. The camera sensor is configured to detect levels of particulate material along sidewalls of a tank. For example, sidewalls disposed on opposite sides of the storage tank may include certain markings (e.g., painted markings, stickers, etc.) located at certain positions along each sidewall. Each marking may indicate a level along each sidewall. The markings may be distinguishable in color compared to the particulate material such that the camera sensor may detect a difference between the particulate material and the markings. Based upon the difference in color, the camera sensor may output signal(s) to the controller indicative of a first level of particulate material at a first sidewall and a second level of particulate material at a second sidewall. In certain embodiments, the camera sensor may output a signal to the controller indicative of an image of the particulate material, the first sidewall, and the second sidewall, and the controller may determine the first level of the particulate material at the first sidewall and the second level of the particulate material at the second sidewall based on the image.

The controller may determine whether a difference between the first level and the second level is greater than a level difference threshold value. In certain embodiments, the controller may determine a measured profile based on the first level and the second level, may compare the measured profile to a target profile, and may determine whether a difference between the measured profile and the target profile is greater than a profile difference threshold value. Based on the determination that the difference is greater than the level difference threshold value or the profile difference threshold value, the controller activates the agitating system to move particulate material from one sidewall toward the other sidewall. For example, if the first level of particulate material at the first sidewall is less than the second level of particulate material at the second sidewall, and the difference between the first level and the second level is greater than the level difference threshold value, the controller outputs an activation signal to the drive system to activate the agitator to move the particulate material toward the first sidewall. The controller may also output a signal to a user interface to inform an operator of the difference and/or of the activation of the agitator. Each of the embodiments of the particulate material agitation control system described above may be implemented separately or in combination with one another.

Furthermore, embodiments of the particulate material agitation control system may be installed in both new and existing agricultural systems. Installation of the particulate material agitation control system includes disposing an agitating system in a bottom portion of and/or below a storage tank of the agricultural system. The agitating system may be secured to the storage tank via various interface and mounting features, such as fasteners, tab extensions, etc. The agitating system may include a drive system having at least one motor configured to drive an agitator of the agitating system. Alternatively, existing motors within the agricultural system may drive the agitator.

With the foregoing in mind, the present embodiments relating to particulate material agitation control systems may be utilized within any suitable agricultural system. For example, FIG. 1 is a side view of an embodiment of an agricultural implement 10 coupled to an air cart 12. A particulate material agitation control system may be used in the air cart 12. As depicted, the agricultural implement 10 includes a tool frame 14 coupled to a row unit 16 (e.g., ground engaging opener assembly), a header 18, and wheel assemblies 20. The agricultural implement may be pulled by a work vehicle (e.g., a tractor) to deposit rows of particulate material (e.g., agricultural product within a field). Wheel assemblies 20 may contact the surface of the soil to enable the agricultural implement 10 to be pulled by the work vehicle. As the agricultural implement 10 is pulled, a row of the particulate material may be deposited into the soil by each row unit 16 (e.g., ground engaging opener assembly). Although only one row unit 16 is shown, the agricultural implement 10 may include multiple row units 16 organized in one or more rows across the agricultural implement 10. In some embodiments, the agricultural implement 10 may include one or more rows of 12, 14, 16, 18, 20, or more row units 16, which may each deposit a respective row of particulate material into the soil.

To facilitate depositing the particulate material, the row unit 16 (e.g., ground engaging opener assembly) in the illustrated embodiment, includes an opener 17, a press wheel 19, and a particulate material tube 21. While the opener 17 engages the soil, the opener 17 may exert a force onto the soil that excavates a trench into the soil as the row unit 16 travels through the field. The particulate material may be deposited into the excavated trench via the particulate material tube 21. Then, the press wheel 19 may pack soil onto the deposited particulate material. In certain embodiments, the press wheel of at least one row unit may be omitted. For example, at least one press wheel may be mounted to the frame of the implement behind the at least one row unit. Furthermore, while the illustrated row unit includes a ground engaging opener assembly, in alternative embodiments, at least one row unit on the implement may include an applicator assembly configured to deposit particulate material onto the surface of the field, or any other suitable type of product deposition assembly.

The header 18 may provide the particulate material to the row units 16. In some embodiments, the header 18 may pneumatically distribute the particulate material from a primary conduit to secondary conduits. In the illustrated embodiment, a primary conduit 34 directs particulate material from the air cart 12 (e.g., a metering system 33 of the air cart) to the header 18. Additionally, the header 18 is configured to distribute the particulate material to the row units 16 via respective secondary lines 22. In certain embodiments, multiple primary conduits may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the illustrated embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement may be towed behind the air cart. In further embodiments, the implement and the air cart may be part of a single unit that is towed behind the work vehicle or may be elements of a self-propelled vehicle.

The air cart 12 may centrally store particulate material and distribute the particulate material to the header 18. The air cart 12 includes a storage tank 26, a frame 28, wheels 30, and an air source 32. As illustrated, the towing hitch 24 is coupled between the tool frame 14 of the agricultural implement 10 and the air cart frame 28, which enables the air cart 12 to be towed with the agricultural implement 10. Additionally, the storage tank 26 is configured to centrally store the particulate material. In some embodiments, the storage tank 26 may include multiple compartments for storing different types of particulate material. For example, a first compartment may store seeds while a second compartment may store a dry fertilizer. In such configurations, the air cart 12 may deliver both seeds and fertilizer to the implement 10 via separate distribution systems, or as a mixture through a single distribution system. Further, a particulate material agitation control system 37 may be disposed in the storage tank 26 and/or below the storage tank 26 and may be configured to control a profile and/or one or more levels of the particulate material in the storage tank 26.

From the particulate material agitation control system 37, the particulate material may be fed into the metering system 33, which meters the particulate material, fluidizes the particulate material via a fluidizing airflow from the air source 32, and distributes the particulate material to the header(s) 18 via the primary conduit(s) 34. As depicted, the metering system 33 is mounted to the bottom of the storage tank 26. To facilitate distributing the particulate material, the fluidizing air generated by the air source 32 is guided though the metering system 33 via a plenum 36. In some embodiments, the air source 32 may be one or more pumps and/or blowers powered by electric or hydraulic motor(s), for example.

Figure 2:
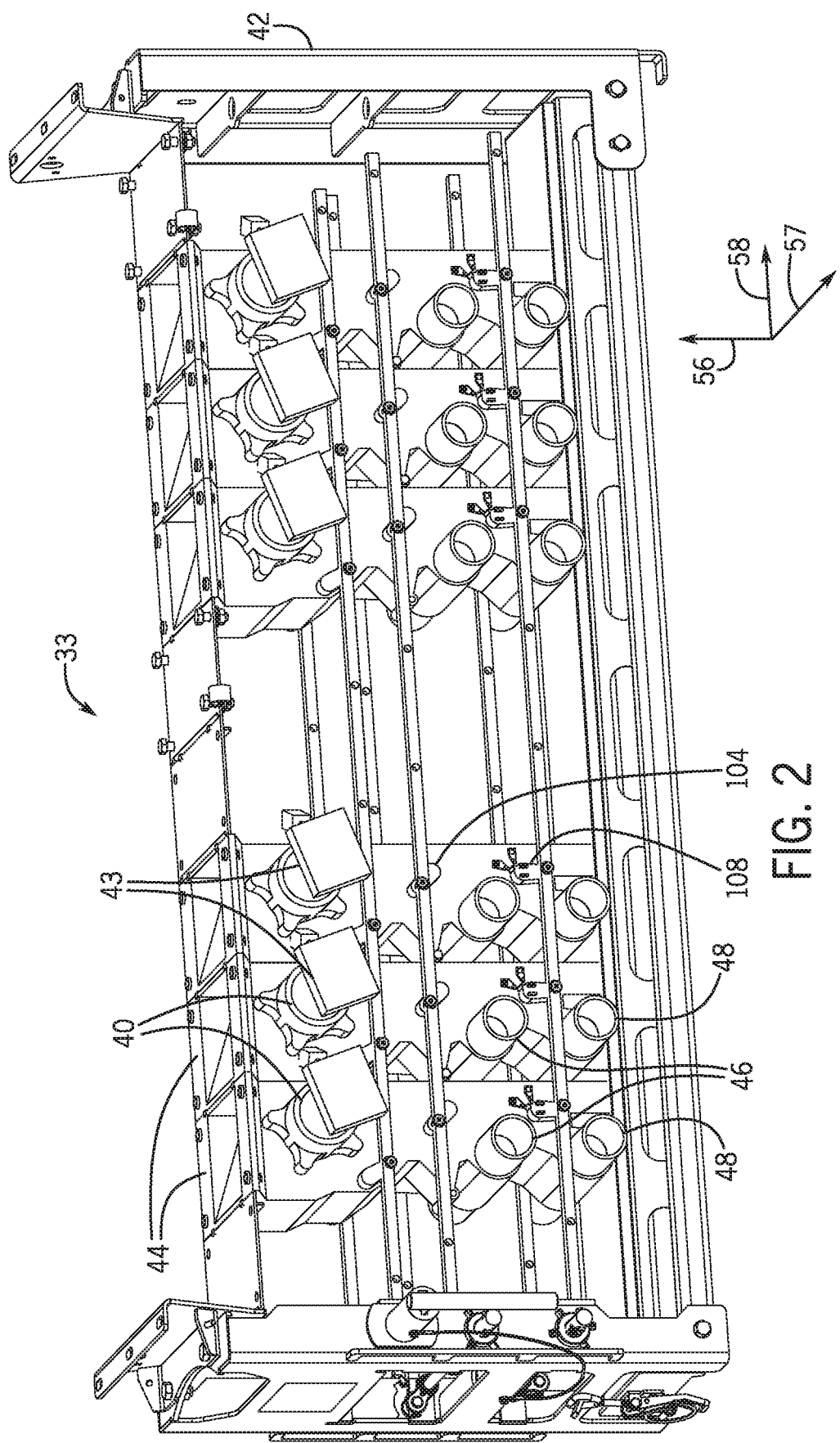
FIG. 2 is a perspective view of an embodiment of a metering system that may be employed within the air cart of FIG. 1.

FIG. 2 is a perspective view of an embodiment of a metering system 33 that may be employed within the air cart of FIG. 1. As illustrated, the metering system 33 includes ten meters 40 supported by a frame 42. While the illustrated embodiment includes ten meters 40, more or fewer meters may be employed in alternative embodiments. For example, certain metering systems may include 1, 2, 4, 6, 8, 10, 12, 14, or more meters. In the illustrated embodiment, each meter 40 includes at least one respective metering device (e.g., meter roller, auger, etc.) to control a flow of particulate material to a respective conduit. The metering device(s) of each respective meter 40 may be coupled to a respective motor 43 configured to drive the metering device(s) to rotate to control the flow of the particulate material through the respective meter 40. Each meter 40 also includes an inlet 44 configured to receive the particulate material from the agitating system (e.g., along a vertical axis 56). Furthermore, each meter 40 includes a first conduit connector 46 and a second conduit connector 48. Each conduit connector is configured to receive the air flow from an air source and the particulate material from the metering device, thereby producing the air/material mixture. First conduits may be coupled to the first conduit connectors 46 and second conduits may be coupled to the second conduit connectors 48. Furthermore, each meter 40 includes a first gate 104 that enables selection of the first conduit connector 46 and a second gate 108 that enables selection of the second conduit connector 48. Once the first conduit connector 46 or second conduit connector 48 is selected, particulate material flows through the selected conduit connector. The conduits may be coupled to respective row units and/or distribution headers that provide particulate material to multiple row units.

The motors 43 are configured to control the flow of particulate material through the meters 40. The motors 43 may be controlled by a controller of the particulate material agitation control system 37 and/or another controller of the air cart. For example, the motor 43 may be controlled by a motor controller or by a controller configured to control the motors 43 and the agitating system. Certain motors 43 may be activated and/or controlled to control particulate material flow through respective meters 40 based on a geographical location of the air cart. For example, as an air cart enters a geographical area, a first set of row unit(s) that receive particulate material from a first set of meters 40 of the metering system 33 may be disposed above an area intended to be seeded during seeding operations. Motors 43 of the meters 40 of the first set may be activated to enable particulate material to flow through the first set of meters 40. Concurrently, a second set of row unit(s) that receive particulate material from a second set of meters 40 may be disposed above a geographical area that is not intended to be seeded. The motors 43 of the second set of meters 40 may remain or may be deactivated to block particulate material from flowing through the second set of meters 40. As individual row unit(s) coupled to meters 40 of the first set of meters 40 move over an area that is not intended to be seeded, their respective motors 43 may deactivate to stop the flow particulate material through the meter 40. Additionally, as individual row unit(s) coupled to meters 40 of the second set of meters 40 pass over an area intended to be seeded, their respective motors 43 may activate to enable the flow of particulate material. Further, a speed at which individual meter(s) 40 flow the particulate material may be adjusted based on the geographical location of the respective row unit(s) that receive the particulate material from individual meter(s) 40. Certain embodiments of the particulate material agitation control system 37 may include one or more meters 40, including respective motor(s) 43.

Figure 3:
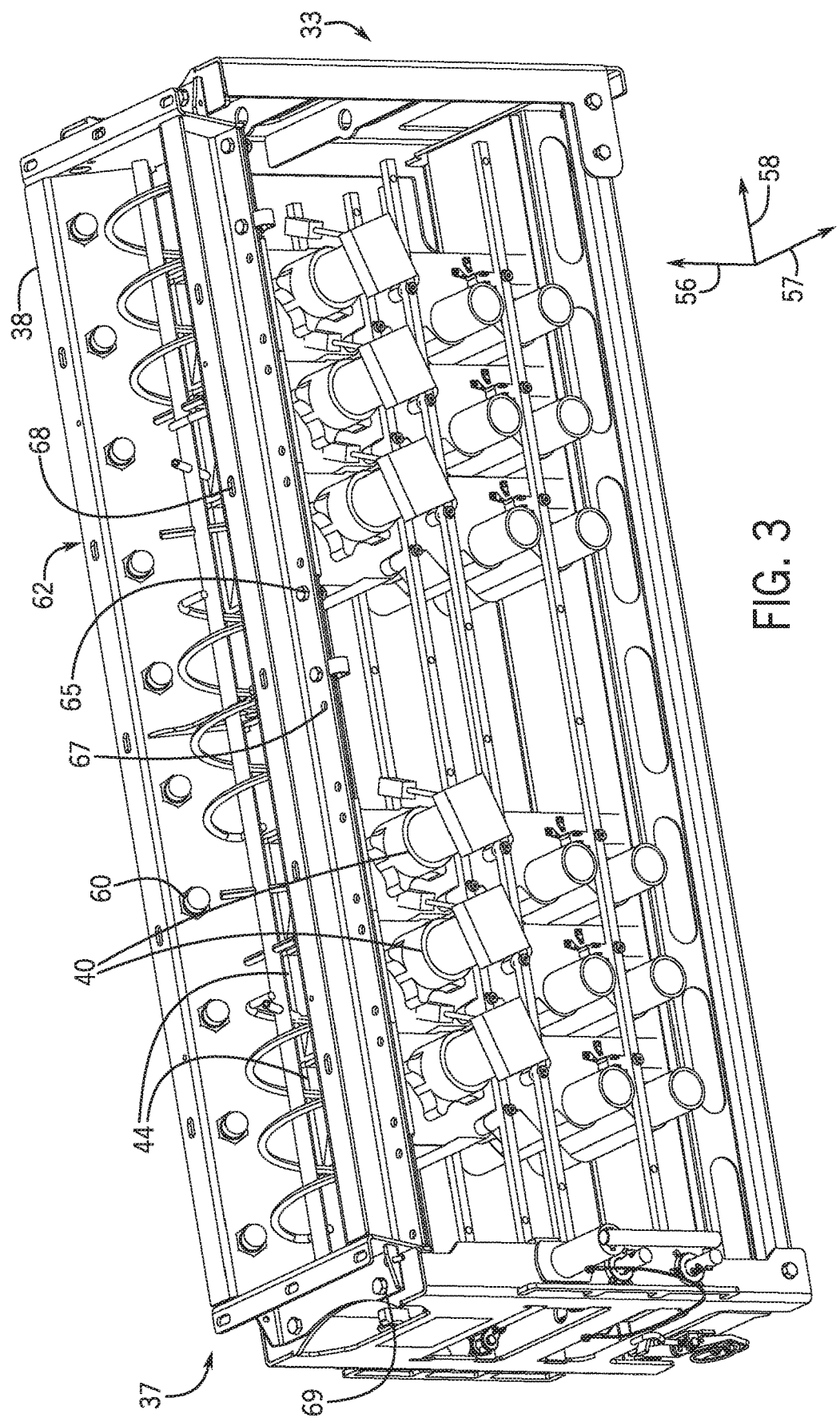
FIG. 3 is a perspective view of an embodiment of a particulate material agitation control system positioned above the metering system of FIG. 2.

FIG. 3 is a perspective view of an embodiment of a particulate material agitation control system 37 positioned above the metering system 33 of FIG. 2. The particulate material may flow down the storage tank to the metering system 33 via the particulate material agitation control system 37. In the illustrated embodiment, the particulate material agitation control system 37 includes sensors 60 and an agitating system 62. In some embodiments, the sensors 60 may be omitted from the particulate material agitation control system 37. As previously discussed, the particulate material agitation control system 37 may be disposed in the storage tank just above the metering system 33 and/or below the storage tank. As shown, the particulate material agitation control system 37 is disposed above the metering system 33 with respect to the vertical axis 56, such that the particulate material may flow from the particulate material agitation control system 37 into the inlets 44 of the meters 40 of the metering system 33. In some embodiments, the particulate material may pass through other features of the agricultural system (e.g., air cart) before entering the metering system 33.

In the illustrated embodiments, the particulate material agitation control system 37 includes a hopper 38. The hopper 38 is secured to a frame of the metering system 33 by fasteners 65 disposed through holes 67 and 69 of the hopper. Holes 67 are arranged along a width of the hopper 38 (e.g., along the lateral axis 58), and holes 69 are arranged along a length of the hopper 38 (e.g., along the longitudinal axis 57). The hopper 38 also includes holes 68 configured to receive fasteners 65 for securing the hopper 38 to the storage tank housing structure or other portion of the agricultural system (e.g., air cart).

Figure 4:
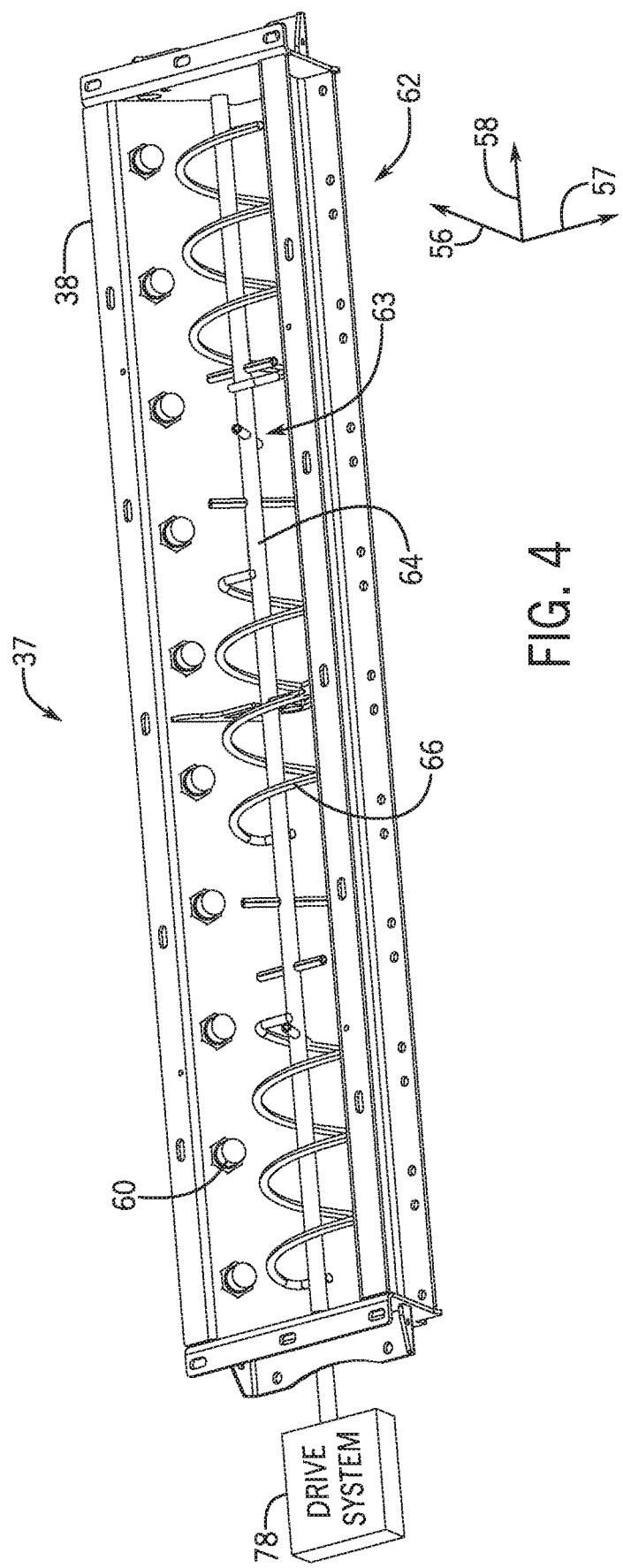
FIG. 4 is a top perspective view of the particulate material agitation control system of FIG. 3.

FIG. 4 is a top perspective view of the particulate material agitation control system 37 of FIG. 3. As illustrated, ten sensors 60 are placed along a wall of the hopper 38 (e.g., along the lateral axis 58). However, more or fewer sensors may be employed in alternative embodiments. For example, certain embodiments may include 1, 2, 3, 4, 6, 8, 10, 12, 14, or more sensors 60. Additionally, the sensors 60 may be omitted from the particulate material agitation control system 37 in certain embodiments. The sensors 60 are configured to detect a measured profile of particulate material disposed in the particulate material agitation control system 37 and/or storage tank before, during, and/or after seeding operations. The measured profile is the shape of the top surface of particulate material disposed in the hopper and/or storage tank and may be one-dimensional or two-dimensional. Additionally, the measured profile consists of a series of levels in which each level spans the width of the hopper. For example, each sensor may detect a level of the top surface of particulate material in the hopper and/or storage tank. A measured profile may be determined based on the series of detected levels of particulate material.

A variety of sensor(s), such as ultrasonic sensor(s), electrostatic sensor(s), inductive sensor(s), Light Detection and Ranging (LIDAR) sensor(s), and/or other suitable sensor(s) may be used alone or in combination with one another to detect the measured profile of the particulate material. The sensor(s) may also include a camera sensor disposed in the hopper and/or storage tank. The camera sensor may be configured to detect the measured profile. Additionally, in alternative embodiments, the sensors 60 may disposed higher in the particulate material agitation control system 37 or may be disposed above the particulate material agitation control system 37 (e.g., along the vertical axis 56). As illustrated in FIG. 4, the sensors 60 are aligned in a row above the agitating system 62, however, the sensors 60 may be disposed in other suitable configurations/arrangements in the particulate material agitation control system 37 and/or in the storage tank.

An agitator 63 of the agitating system 62 is disposed within the hopper 38 along the lateral axis 58 and in an area below the sensors 60 relative to the vertical axis 56. The agitator 63 includes a shaft 64 coupled to a drive system 78 and wrapped wires 66 coupled to the shaft 64. The wrapped wires 66 are wrapped around the shaft 64 (e.g., in a cylindrical form, conical form, helical form, etc.) and enable the particulate material to flow between the shaft 64 and the wrapped wires 66. As the particulate material rests in the storage tank, the particulate material may clump together to form pieces that are larger than desired (e.g., larger than the openings in the metering system). As such, when the particulate material flows through the agitating system 62, the clumps of particulate material break into smaller pieces more suitable for flowing through the metering system 33. For example, the shaft 64 and the wrapped wires 66 may apply a force to portions of the particulate material (e.g., to clumps) as the shaft 64 and the wrapped wires 66 rotate. The force applied to the particulate material may break clumps of the particulate material into smaller pieces. In the illustrated embodiment, the agitator 63 may rotate to move particulate material in the hopper 38 and/or storage tank. In certain embodiments, other types of agitators may be used in the agitating system. For example, an agitator may move linearly in the hopper to move the particulate material.

The drive system 78 of the particulate material agitation control system 37 may be configured to turn the agitator 63. The drive system 78 may include a motor configured to turn an agitator (e.g., an electric motor, hydraulic motor, etc.). In the illustrated embodiment, the drive system 78 includes a single motor disposed at end of the hopper 38, however, the drive system may include more than one motor (e.g., 2, 3, 4, 5, etc.). For example, the drive system may include a motor disposed at each lateral end of the hopper. The drive system may also include motor(s) disposed along the width of the hopper. Motor(s) disposed along the width of the hopper may be connected to the agitator and may be configured to drive the agitator. As the agitator 63 turns, the particulate material moves within the hopper 38. Further, the agitator may be mounted higher in the storage tank relative to the hopper. For example, the agitator may be disposed above the hopper.

In the illustrated embodiment, the agitating system 62 includes a single agitator 63. In certain embodiments, multiple agitators (e.g., 2, 3, 4, 5, 6, 7, 8, etc.) may be disposed in the hopper 38 and/or storage tank. The agitators may be disposed in series or in parallel. In a configuration with more than one agitator, drive system(s) may drive only a portion of the agitators or all the agitators to move the particulate material in one or more directions. Multiple agitators may also be disposed at different levels in the hopper and/or storage tank. For example, one or more agitator(s) may be disposed in the hopper and one or more agitator(s) may be disposed higher in the storage tank.

Figure 5:
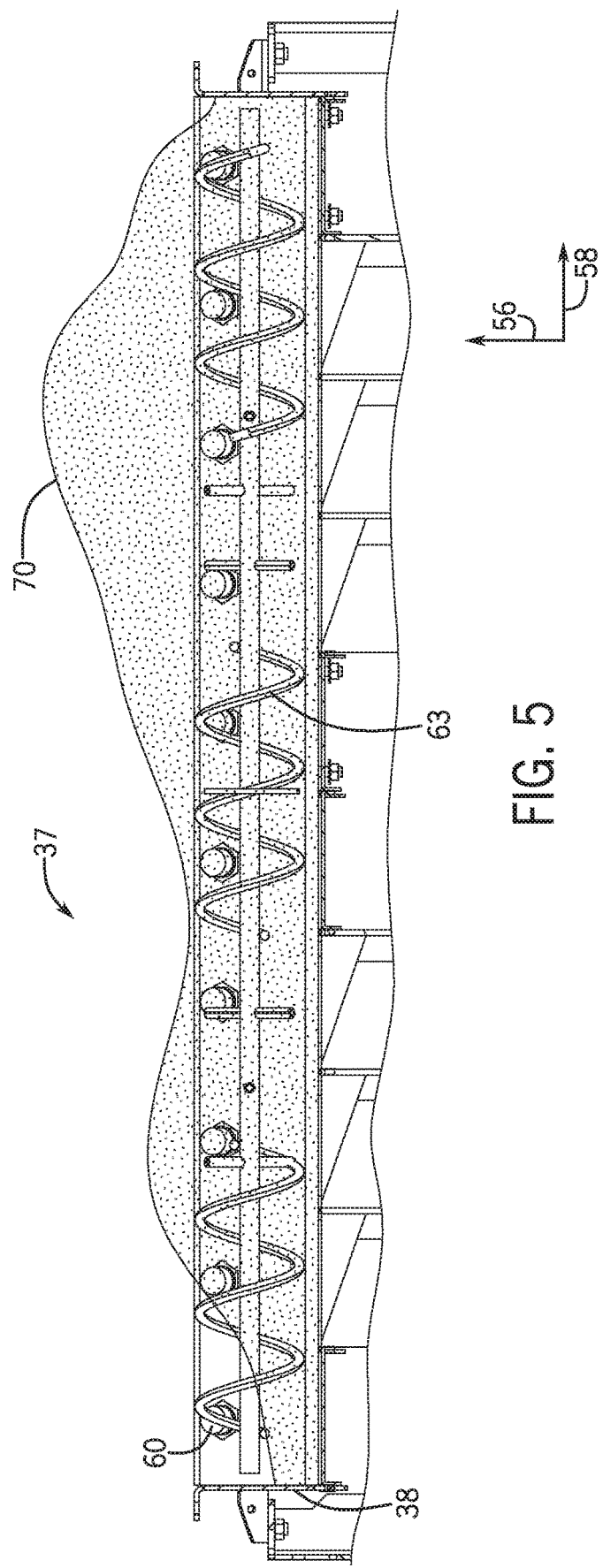
FIG. 5 is a cross-sectional view of the particulate material agitation control system of FIG. 3, with particulate material disposed therein.

FIG. 5 is a cross-sectional view of the particulate material agitation control system of FIG. 3 with particulate material disposed therein. The particulate material 70 is disposed at various levels within the hopper 38 along the lateral axis 58, thereby establishing a profile. The particulate material may be disposed above, below, partially above, and partially below the sensors 60. The sensors 60 may detect a measured profile of the particulate material 70 based on the position of the particulate material relative to the sensors 60. In the illustrated embodiment, the particulate material agitation control system 37 includes multiple sensors 60, each of which may be configured to detect a vertical level of the particulate material 70 proximate to the sensor (e.g., material height along the vertical axis 56). From the detected levels of particulate material 70, a measured profile may be established (e.g., by linearly extrapolating the data points or by another suitable method). Alternatively, a single sensor may be used alone or in combination with other sensors to detect a measured profile of the particulate material 70. For example, a single LIDAR sensor (e.g., mounted near a top portion of the storage tank) may be configured to detect the measured profile.

Furthermore, the sensors may also be used to detect level(s) of particulate material in the storage tank. An operator may desire to know the amount of particulate material remaining in the storage tank, and the sensors may be configured to detect the particulate material within the storage tank. In this manner, information regarding the particulate material level in the storage tank and the profile proximate to the hopper may be collected and presented to the operator.

As illustrated in FIG. 5, the particulate material 70 is disposed in the hopper 38 below the far left sensor 60. In certain embodiments, the sensors 60 may detect that the measured profile of particulate material 70 is disposed below the far left sensor 60 and above the remaining sensors 60. The particulate material agitation control system 37 may compare the measure profile to a target profile. If a variation between the measured profile and the target profile is greater than a profile variation threshold value, the particulate material agitation control system 37 may cause an agitator 63 to activate and move particulate material toward the far left side of the hopper 38. Accordingly, the particulate material agitation control system 37 may decrease the variation between measured profile and the target profile. The target profile may be a one-dimensional or two dimensional profile and may consist of a series of levels in which each level spans the length of the hopper and/or storage tank. In the illustrated embodiment, the target profile is a generally flat profile positioned along the level of the sensors 60. In certain embodiments, the target profile may be curved, may include flat portions, may include angled portions, or a combination thereof. In certain embodiments, when the measured profile is compared to the target profile, individual corresponding levels of the measured profile and target profile are compared.

Additionally, the profile of particulate material illustrated in FIG. 5 may be determined based upon an output amount of particulate material that has passed through individual meters of the metering system disposed below the hopper 38. For example, in the illustrated embodiment, more particulate material has passed through meters generally located below a left portion of the hopper 38, as compared to particulate material that has passed through meters generally located below a right portion of the hopper 38. A controller of the particulate material agitation control system 37 may determine the output amount of each meter of the plurality of meters based on an activation, deactivation, rotation speed, or a combination thereof, of a metering device of each meter. The controller may determine the measured profile of the particulate material 70 based upon the output amount of individual meters of the metering system. For example, the controller may determine an output amount of each meter of a plurality of meters of the metering system. Based on the plurality of output amounts, the controller may determine a measured profile and may compare the measured profile to a target profile. The controller may determine whether the variation exceeds a profile variation threshold value, and based on the variation exceeding the profile variation threshold value, output an activation signal to the drive system indicative of activation of the agitator to reduce the variation.

The target profile may also span all or a portion of the width of the hopper and/or storage tank. For example, if all of the meters in the metering system are operating at the same speed, the target profile may be consistent and/or flat across the entire hopper. In other embodiments, if only a portion of the meters are active, the target profile may vary. For example, the target profile may be at a consistent first level over the active meters and at a consistent second level over the non-active meters. The target profile above the non-active meters may be zero (e.g., the target profile may indicate that particulate material should not be disposed above the non-active meters). Accordingly, the particulate material agitation control system may move particulate material from an area of above non-active meters to an area above active meters.

The profile variation threshold value may be any value selected by an operator and/or determined by the particulate material agitation control system (i.e., 1 centimeter (cm), 2 cm, 3 cm, 4 cm, 5 cm, 10 cm, 50 cm, 100 cm, etc.). The profile variation threshold value may depend on the type of particulate material, the type of agricultural system, etc. being used. If a variation between a measured profile and the corresponding target profile exceeds the profile variation threshold value, the particulate material agitation control system may respond by reducing the variation. The variation is the difference between the measured profile and a corresponding target profile.

In certain embodiments, the particulate material agitation control system may only operate when the measured level of particulate material reaches a particular level in the storage tank. For example, the particulate material agitation control system may operate once the level of particulate material is at a level of one third of the storage tank capacity. An operator may choose to set this level to control operation of the particulate material agitation control system.

Figure 6:
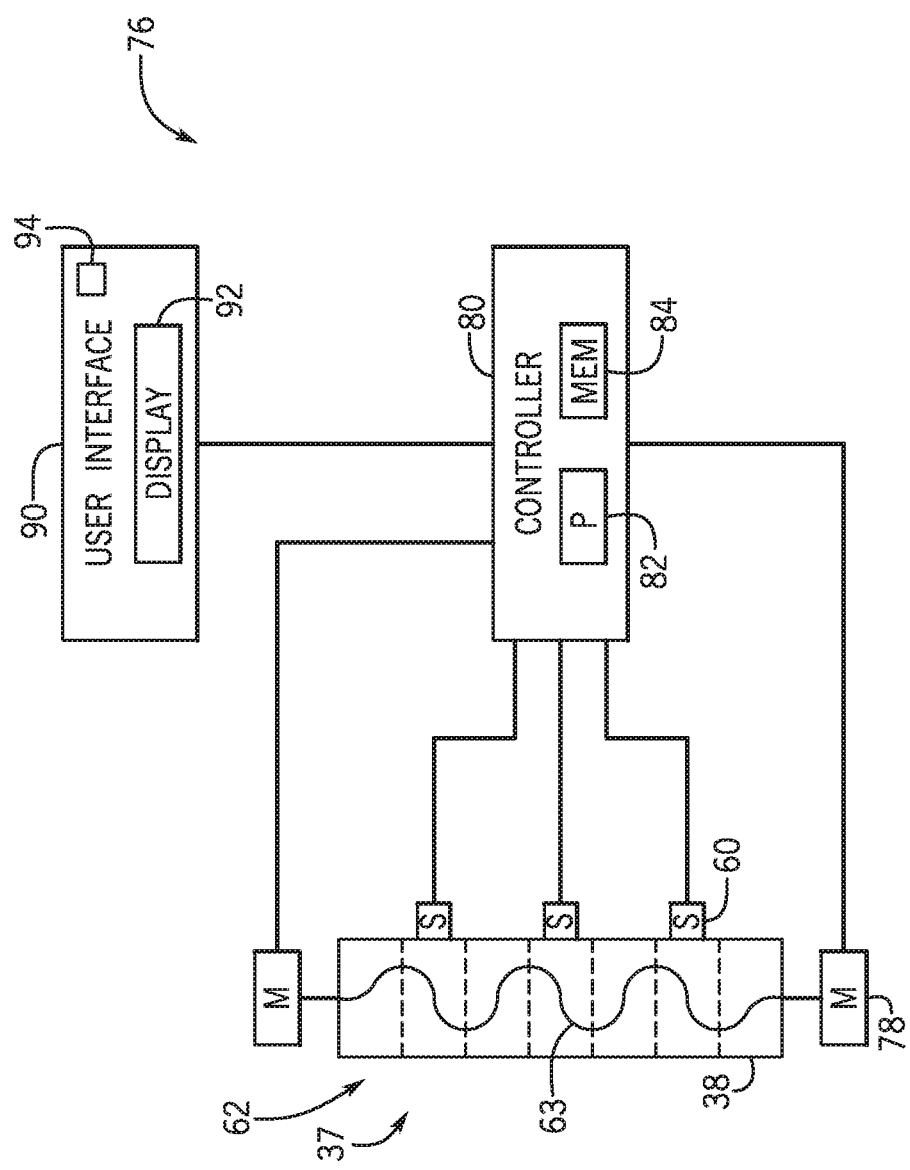
FIG. 6 is a block diagram of an embodiment of a particulate material agitation control system that may be employed within the air cart of FIG. 1.

After the measured profile of particulate material is determined, the operator may be notified of a variation between the measured profile and the target profile of the particulate material, and/or the particulate material agitation control system may automatically take action to move the particulate material to decrease the difference between the measured profile and target profile. FIG. 6 is a block diagram 76 of an embodiment of a particulate material agitation control system 37 that may be employed within the air cart of FIG. 1. The sensors 60 may detect a measured profile of the particulate material in the hopper 38. Signal(s) corresponding to the measured profile may be output from the sensors 60 to a controller 80. In certain embodiments, the controller 80 is an electronic controller and includes a processor 82 and a memory device 84. The controller 80 may also include one or more storage devices and/or other suitable components. Data included in the signals corresponding to the measured profile may be stored in the memory device 84 of the controller 80. Additionally, data corresponding to a target profile may be stored in the memory device 84. The target profile may be entered by the operator before or during operation of the agricultural system or may be determined based on data stored in the memory device 84.

The memory device 84 may include a volatile memory, such as random access memory (RAM), and/or a nonvolatile memory, such as read-only memory (ROM). The memory device 84 may store a variety of information and may be used for various purposes. For example, the memory device 84 may store processor-executable instructions (e.g., firmware or software) for the processor 82 to execute, such as instructions for controlling the drive system 78. The storage device(s) (e.g., nonvolatile storage) may include ROM, flash memory, a hard drive, or any other suitable optical, magnetic, or solid-state storage medium, or a combination thereof. The storage device(s) may store data (e.g., the target profile of particulate material, the number of rotations to turn an agitator, or the like), instructions (e.g., software or firmware for controlling the drive system 78), and any other suitable data. The processor 82 and/or memory device 84, and/or an additional processor and/or memory device, may be located in any suitable portion of the system. For example, a memory device for storing instructions (e.g., software or firmware for controlling portions of the drive system 78) may be located in or associated with the drive system 78.

In the illustrated embodiment, the controller 80 also includes the processor 82, such as a microprocessor. The processor 82 may be used to execute software, such as software for controlling the drive system 78. Moreover, the processor 82 may include multiple microprocessors, one or more "general-purpose" microprocessors, one or more special-purpose microprocessors, and/or one or more application specific integrated circuits (ASICS), or some combination thereof. For example, the processor 82 may include one or more reduced instruction set (RISC) or complex instruction set (CISC) processors.

If a variation between the measured profile of the particulate material and the target profile is greater than a profile variation threshold value, the controller 80 may send a signal to a user interface 90 indicative of instructions of inform an operator of the profile variation. In the illustrated embodiment, the user interface 90 includes a display 92, which may present information to an operator, including an indication that the variation between the measured profile and the target profile is greater than the profile variation threshold value. The display 92 may also be configured to present a graphical representation of the measured profile, the target profile, the profile variation threshold value, or a combination thereof. In some embodiments, the display 92 may be configured to indicate an amount of particulate material that has passed through individual meters of the metering system. Based upon this display of information, the operator may activate the agitating system to decrease the variation between the measured profile and the target profile and/or to move particulate material in the agitating system. For example, in the illustrated embodiment, the user interface 90 includes a user interaction device 94, such as button(s), that may send a signal to the drive system 78 indicative of activation of the agitating system 62. If the particulate material level is low at one portion of the hopper 38, the operator may select an operation of the agitating system 62 to control movement of the particulate material to that portion of the hopper 38.

Moreover, the agitating system 62 may move in either direction to move the particulate material. For example, if the particulate material is low in a portion of the hopper 38, such as at an end of the hopper 38, the operator may select a direction for the agitating system 62 to rotate. The rotation of the agitating system 62 may move the particulate material to that portion of the hopper 38. Accordingly, the agitating system 62 may move the particulate material to any portion of the hopper 38. Further, if more than one agitator is included in the agitating system, a drive system may be coupled to each agitator, thereby enabling the direction of rotation of each agitator to be independently controllable.

Further, the agitator(s) in the agitating system may change direction, and in agitating systems having multiple agitators, the agitators may move in the same and/or opposite directions. For example, if a single agitator is used in the particulate material agitation control system, the agitator may move in multiple directions to agitate and move the particulate material. The agitator may rotate in a first direction to move the particulate material to the left and in a second direction to move the particulate material to the right, for example. In embodiments using multiple agitators, the agitators may move in the same direction to move particulate material to a particular portion of the hopper or may move in opposite directions to move the particulate material. For example, an agitator may be disposed at each lateral end of a hopper. As particulate material flows through the hopper, the variation between the measured profile of particulate material and target profile may exceed a profile variation threshold value at each lateral end of the hopper. In this example, the agitators disposed at each lateral end may rotate in opposite directions to move the particulate material toward respective lateral ends of the hopper.

The controller 80 may also output signal(s) to the drive system 78 of the agitating system indicative of instructions to activate an agitator 63 in response to determining that the variation between the measured profile and the target profile is greater than the profile variation threshold value. Based on the signal(s) from the controller 80, the drive system 78 may drive the agitator 63 to decrease the variation between the measured profile and target profile of particulate material. In another embodiment, the drive system 78 may be connected to two or more agitators and may drive only a portion of the agitators or all of the agitators of the agitating system to decrease the variation between the measured profile and target profile of the particulate material. For example, if a variation between the measured profile and target profile exists in a portion of the hopper where only one agitator is disposed, the drive system may drive that agitator to move particulate material to reduce the profile variation.

Figure 7:
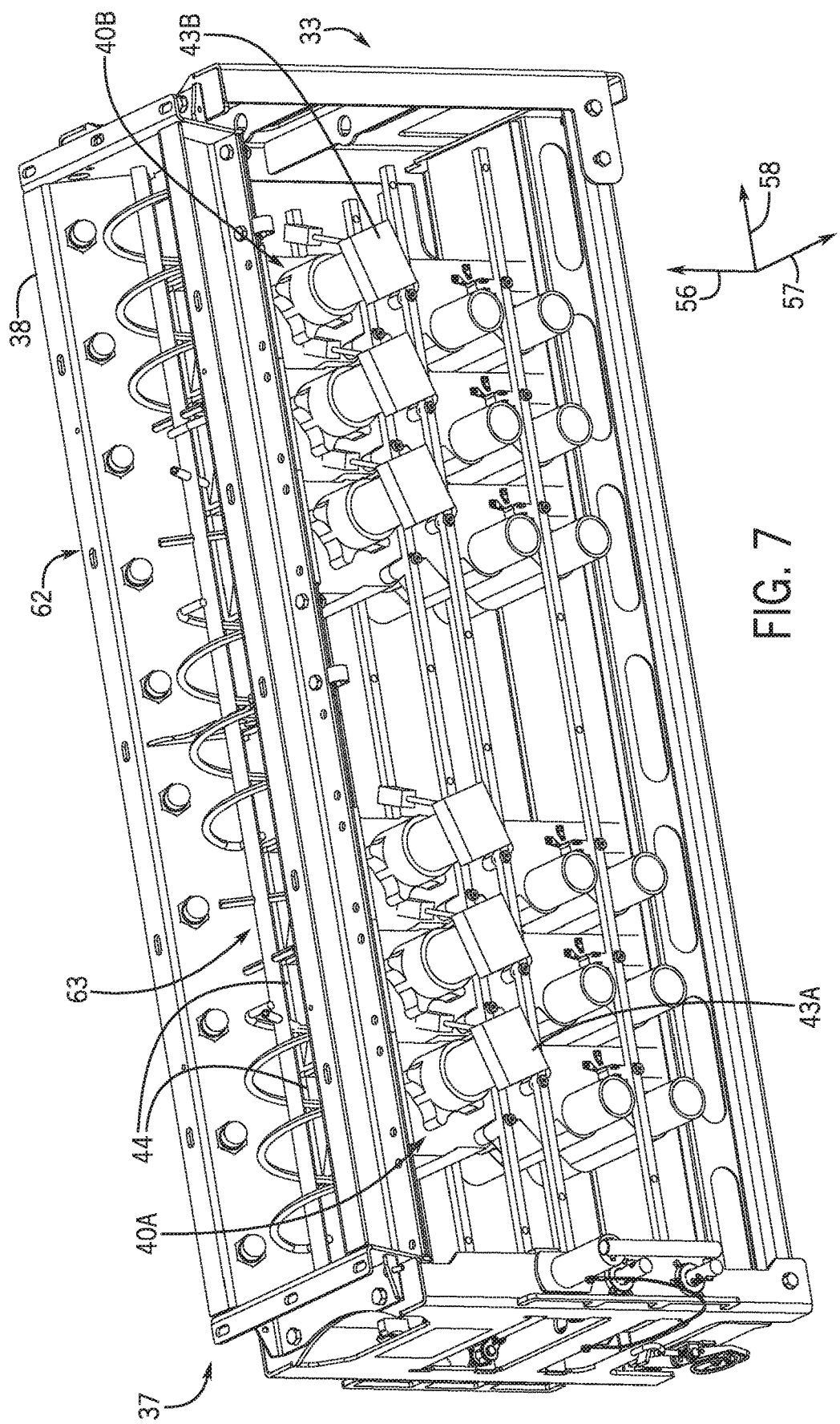
FIG. 7 is a perspective view of an embodiment of a particulate material agitation control system positioned above the metering system of FIG. 2.

FIG. 7 is a perspective view of an embodiment of a particulate material agitation control system 37 positioned above the metering system 33 of FIG. 2. Certain embodiments of the particulate material agitation control system 37 may include all or portions of the metering system 33. For example, the particulate material agitation control system 37 may include meter(s), motor(s), other portions of the metering system 33, or a combination thereof. In the illustrated embodiment, the metering system 33 includes six meters. A first meter 40A is located at a first position on a lateral end of the metering system 33, and a second meter 40B is located at a second position on an opposite lateral end of the metering system 33. In some embodiments, the first meter and second meter may be located at other positions along the metering system 33.

As described herein, each meter is configured to output an amount of particulate material for seeding operations. For example, the first meter 40A may output a first amount of particulate material, and the second meter 40B may output a second amount of particulate material. In certain embodiments, the first output amount and the second output amount may be the same, and in other embodiments, the first output amount and the second output amount may be different. The output amount of each meter is controlled by a motor coupled to a respective metering device (e.g., meter roller) of each meter. In the illustrated embodiment, the first meter 40A includes a first motor 43A, and the second meter 40B includes a second motor 43B.

Further, the motors of the meters are controlled by a controller. The controller is configured to output signal(s) to the motors to control a flow of particulate material through each meter. In the illustrated embodiment, the first meter 40A includes a first metering device coupled to the first motor 43A. A controller may send a signal to the first motor 43A to activate, deactivate, and control a rotation rate of the first metering device based upon certain factors described herein. Additionally, the controller may send a signal to the second motor 43A to activate, deactivate, and control a rotation rate of a second metering device of the second meter 40B.

In certain embodiments, the controller may be a motor controller configured to control the motors. The motor controller may output signals to an agitation controller indicative of flowrates and/or total output amounts of the meters at certain positions along the metering system. For example, the motor controller may output a first output signal to the agitation controller indicative of a first output amount of particulate material of the first meter 40A (e.g., at the first position) and may output a second output signal to the agitation controller indicative of a second output amount of particulate material at the second meter 40B (e.g., at the second position). In other embodiments, the motor controller and the agitation controller may be a single controller such that the signals indicative of the flowrates and/or the total output amounts of the meters may be omitted.

The controller (e.g., the single controller) may determine the output amount for each meter based on certain factors. For example, the output amount of a meter may be based on a geographical location of a row unit coupled to the meter, an amount of elapsed time, a level of particulate material in a storage tank detected by a camera sensor, other factors affecting a desired output amount, or a combination thereof.

As described below in reference to FIG. 9, the controller may determine whether a difference between the particulate material output by individual meters is greater than an output difference threshold value. If the difference is greater than the output difference threshold value, the controller may output an activation signal to the drive system of the agitating system indicative of instructions to activate the drive system to move the particulate material. For example, if the controller determines that a difference between the first output amount from the first meter 40A and the second output amount from the second meter 40B is greater than the output difference threshold value, the controller outputs an activation signal to activate the drive system of the particulate material agitation control system 37. An agitator 63 of the agitating system may then move the particulate material toward either the first meter 40A or the second meter 40B. The activation signal may include instructions to turn the agitator 63 for a specific number of revolutions, for a specific amount of time, in a particular direction, or a combination thereof.

In some embodiments, the controller may determine a measured profile of particulate material in the storage tank and/or hopper based on output amounts from meters of the metering system. The controller may determine whether a variation exists between the measured profile and a target profile and may compare the variation to the output difference threshold value or a profile variation threshold value. Based on the variation exceeding the output difference threshold value or the profile variation threshold value, the controller may output a signal to the agitating system to move the particulate material based on the difference or variation.

In some embodiments, the particulate material agitation control system 37 may include a camera sensor disposed generally above the agitating system. The camera sensor may be configured to detect one or more levels of particulate material in the storage tank and may output camera sensor signal(s) to the controller indicative of the one or more levels. Based on the signal(s) received from the camera sensor, the controller may activate the agitating system 62 to move particulate material in the storage tank. For example, the camera sensor may detect that the particulate material is at a first level at a first lateral side of the storage tank and may output a first signal to the controller indicative of the first level. The camera sensor may detect that the particulate material is at a second level at a second lateral side of the storage tank and may output a second signal to the controller indicative of the second level. The controller may compare a difference between first and second levels with a level difference threshold value and may activate the agitating system based on this comparison. Additionally, the controller may determine the measured profile based on the first and second levels, may compare the measured profile to the target profile, and may activate the agitating system based on the comparison.

Figure 8:
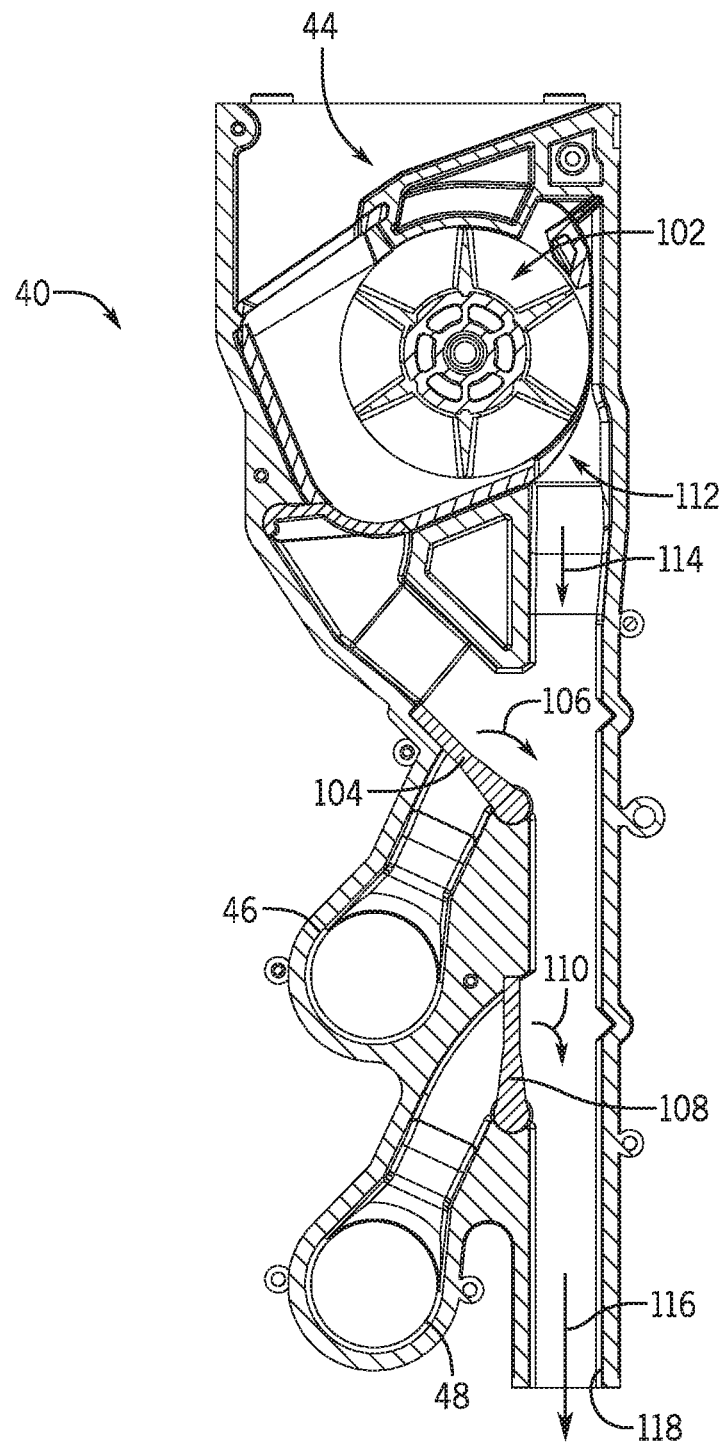
FIG. 8 is a cross-sectional view of an embodiment of a meter that may be employed in the metering system of FIG. 2.

FIG. 8 is a side cross-sectional view of an embodiment of the meter 40 that may be employed in the metering system of FIG. 7. The meter 40 includes an inlet 44 configured to receive particulate material from the storage tank and/or a hopper disposed above the meter 40. The meter 40 also includes a meter roller 102 configured to control a flow of particulate material into the first conduit connector 46 or into the second conduit connector 48 via rotation of the meter roller 102. For example, the meter roller 102 may be driven to rotate such that particulate material flows through the opening 112 in a direction 114. The meter roller 102 may be controlled by a motor configured to rotate the meter roller 102. The flow rate of particulate material through the meter 40 may depend on certain factors, such as a weight of particulate material that passes through the meter 40 during each rotation of the meter roller 102, a density of the particulate material, a type of particulate material, a size/configuration of the meter roller 102, a rotational speed of the meter roller 102, other factors, or a combination thereof. To control the flow rate of particulate material through the meter 40, the meter roller 102 may be calibrated by weighing an amount of particulate material output by the meter roller 102 during a desired number of rotations. During calibration, the particulate material exits the meter 40 in a direction 116 through an opening 118.

To enable the flow of particulate material from the meter roller 102 to the first conduit connector 46, an operator may open a first gate 104. As illustrated, the first gate 104 may be rotated in a direction 106 from the illustrated closed position, which blocks flow into the first conduit connector 46, to an open position, which facilitates flow into the first conduit connector 46. If material flow into the second conduit connector 48 is desired, the operator may open a second gate 108 to direct the material into the second conduit connector 48. As illustrated, the second gate 108 may be rotated in a direction 110 from the illustrated closed position, which blocks flow into the second conduit connector 48, to an open position, which facilitates flow into the second conduit connector 48.

The motor connected to the meter roller 102 may be controlled by a motor controller of the particulate material agitation system 37 and/or a controller of the agricultural implement. For example, once the flow rate of particulate material through the meter 40 is calibrated, a user may control the flow rate based upon certain factors, including a geographical location of a row unit that receives the particulate material from the meter 40 and/or an amount of particulate material in the storage tank and/or the hopper above the meter 40. The user may provide an input to a user interface indicative of instructions to adjust the flow rate, and/or the controller may automatically adjust the flow rate based upon certain factors described herein.

Figure 9:
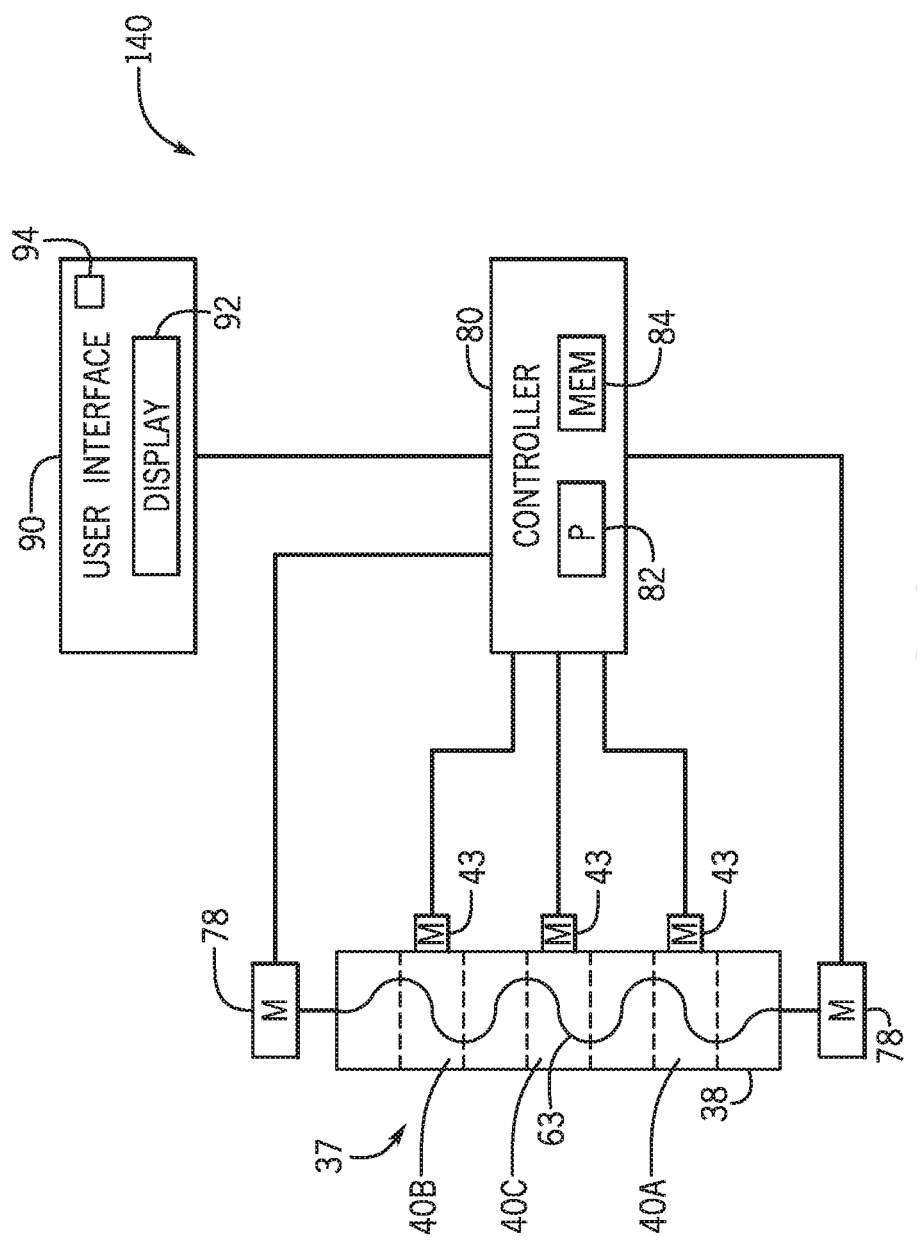
FIG. 9 is a block diagram of an embodiment of a particulate material agitation control system that may be employed within the air cart of FIG. 1.

FIG. 9 is a block diagram 140 of an embodiment of a particulate material agitation control system 37 that may be employed within the air cart of FIG. 1. As described herein, one or more motors may be configured to control one or more metering devices (e.g., meter rollers). In the illustrated embodiment, three meters (e.g., a first meter 40A, a second meter 40B, and a third meter 40C) include three respective motors 43. Each meter is disposed at a particular position along the metering system (e.g., the first meter 40A at a first position, the second meter 40B at a second position, and the third meter 40C at a third position). The meters are disposed below the hopper 38. The motors are configured to control meter rollers to control particulate material flow rates of the meters. For example, each motor 43 may receive a control signal from the controller 80 indicative of instructions to activate, deactivate, or control a rotation rate of a metering device of a respective meter. Based on the received control signal, each motor 43 may control rotation of the respective metering device.

The processor 82 of the controller 80 is configured to determine the output amount of each meter based on the control signals output to each motor 43. For example, the controller may determine the total output amount of each respective meter based on the respective flow rates of each meter. The flow rates of each meter may be based on the control signals sent to respective motors of each meter. The output amounts and/or the flow rates may be stored in the memory 84 of the controller 80.

The processor 82 of the controller 80 is also configured to compare the output amounts of the meters and determine whether a difference between the output amounts is greater than an output difference threshold value. For example, the controller 80 may determine a first output amount of particulate material at the first position and a second output amount of particulate material at the second position. The controller 80, via the processor 82, may determine whether a difference between the first output amount and the second output amount is greater than an output difference threshold value. As described herein, the output difference threshold value may be input by a user to a user interface and/or may be automatically determined by the controller 80 based on certain factors (e.g., characteristics of the particulate material, a size of the agitating system, environmental conditions, a size of each meter, etc.). Based upon the determination that the difference between the first output amount and the second output amount is greater than the output difference threshold value, the controller is configured to output an activation signal to an agitating system indicative of instructions to activate the agitator 63. In the illustrated embodiment, the controller 80 is configured to output an activation signal to the motors 78 of the agitating system indicative of instructions to activate the agitator 63 based upon a determination that the output difference between the first output amount and the second output amount is greater than the output difference threshold value.

The agitator 63 then agitates and moves the particulate material in the hopper 38. For example, if the first output amount from the first meter 40A is greater than the second output amount from the second meter 40B, and the difference between the first output amount and the second output amount is greater than the output difference threshold value, the agitator 63 moves the particulate material from the second position toward the first position.

Figure 10:
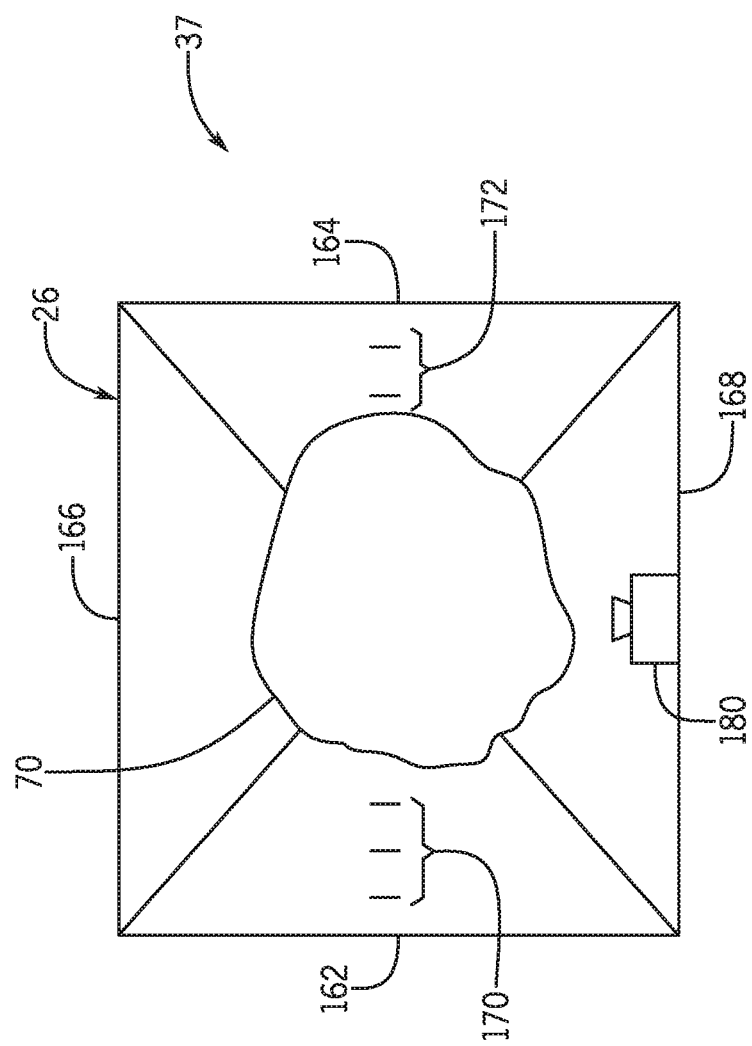
FIG. 10 is a top cross-sectional view of an embodiment of a storage tank of the air cart of FIG. 1.

FIG. 10 is a top cross-sectional view of an embodiment of the storage tank 26 of the air cart of FIG. 1. Certain embodiments of the particulate material agitation control system 37 described herein may include all or portion(s) of the storage tank 26. As illustrated, the storage tank 26 includes a first sidewall 162, a second sidewall 164, a third sidewall 166, and a fourth sidewall 168 to contain particulate material 70. In some embodiments, the storage tank may include more or fewer sidewalls. Additionally, while the storage tank 26 is generally rectangular in shape, the storage tank may form other shapes in alternative embodiments (e.g., cylinder, spherical, etc.). Certain sidewalls of the storage tank include may include set(s) of markings, labels, and/or stickers configured to indicate a level of particulate material at the sidewalls. As illustrated, the first sidewall 162 includes a first set of markings 170, and the second sidewall 164 includes a second set of markings 172.

An agitating system and a metering system are disposed below the particulate material 70. For example, certain embodiments of the agitating system and the metering system of FIG. 7 may be disposed below the particulate material 70 of FIG. 10. In the illustrated embodiment, the agitating system and the metering system extend from the first sidewall 162 to the second sidewall 164 below the particulate material 70. As certain meters of the metering system are activated, the particulate material 70 is dispensed from the storage tank 26. As described above, some meters may be activated while other meters are deactivated. This may generate an uneven distribution and/or profile of the particulate material 70 in the storage tank 26.

In certain embodiments, the particulate material agitation control system 37 includes a camera sensor 180 disposed above the particulate material 70. For example, the top view illustrated in FIG. 10 may be from the perspective of a camera sensor 180 positioned above the particulate material 70. The camera sensor 180 is configured to detect one or more levels of the particulate material 70 at the sidewalls of the storage tank 26 by detecting an optical difference between the particulate material 70 and the first set of markings 170 at the first sidewall 162 and an optical difference between the particulate material and the second set of markings 172 at the second sidewall 164 (e.g., the camera sensor 180 is configured to detect a contrast in color between the particulate material 70 and the first set of markings 170 and between the particulate material 70 and the second set of markings 172). As such, the camera sensor 180 is configured to detect the level of particulate material 70 at each lateral end of the agitating system disposed below the particulate material 70. The storage tank 26 may include markings on other sidewalls to aid the camera sensor 180 in detecting other levels of the particulate material 70.

In the illustrated embodiment, the camera sensor 180 detects that the particulate material 70 disposed at the first sidewall 162 is at a first level based on three marks of the first set of markings 170 being visible. The first level is a level of the particulate material 70 at a first lateral end of the agitating system. The camera sensor 180 also detects that the particulate material 70 disposed at the second sidewall 164 is at a second level based on two marks of the second set of markings 172 being visible. The second level is a level of particulate material 70 at a second lateral end of the agitating system. The camera sensor 180 outputs a first camera sensor signal to the controller indicative of the first level of the particulate material 70 at the first sidewall 162 and a second camera sensor signal to the controller indicative of the second level of the particulate material 70 at the second sidewall 164. In certain embodiments, the camera sensor 180 may output a single signal indicative of a captured image that includes the first level and the second level to the controller. The controller may determine the first level of the particulate material at the first sidewall and the second level of the particulate material at the second sidewall based on the captured image received from the camera sensor 180. The controller may be a controller of the particulate material agitation control system 37 that controls meters of the metering system, the drive system, and/or other components.

The camera sensor 180 may begin outputting signals to the controller after the particulate material in the storage tank 26 drops below an initial level value. For example, the camera sensor 180 may output the first camera sensor signal based on detecting that either the first level or the second level is less than an initial level value. The initial level value may be a level of particulate material input by a user of the particulate material agitation control system 37 or may be automatically determined by a controller of the particulate material agitation control system 37.

In certain embodiments, the markings on the sidewalls may be omitted. For example, the camera sensor 180 may capture images of the particulate material 70 in the storage tank 26 without the markings 170 and the markings 172 and may output signals indicative of the captured images to the controller. The controller may determine one or more level (s) of the particulate material 70 based on the captured images without the markings 170 and the markings 172.

After receiving the first camera sensor signal indicative of the first level of the particulate material 70 and the second camera sensor signal indicative of the second level of the particulate material 70 from the camera sensor 180, the controller, via a processor, determines whether a difference between the first level and second level is greater than a level difference threshold value. In certain embodiments, the controller may determine the first level and the second level based on one or more captured images received from the camera sensor 180, as described above. The level difference threshold value may be input by a user and/or may be automatically determined by the controller 80 based on certain factors (e.g., characteristics of particulate material, environmental conditions, a size of the meters, etc.). Based on the difference exceeding the level difference threshold value, the controller may output a signal to activate, deactivate, or adjust a speed of an agitator. In some embodiments, the controller may inform a user of the difference exceeding the level difference threshold value via an alert or another type of notification.

In certain embodiments, the controller may determine a measured profile based on the first level and the second level. The controller may also determine additional levels of particulate material in the storage tank 26 and include the additional levels in the determination of the measured profile. The controller may determine whether there is a variation between the measured profile and a target profile and whether the variation exceeds a profile variation threshold value. Based the variation exceeding the profile variation threshold value, the controller may output a signal to activate, deactivate, or adjust a speed of an agitator. In some embodiments, the controller may inform a user of the variation exceeding the profile variation threshold value via an alert or another type of notification. In response to receiving the signal from the controller, the agitator moves the particulate material from one area of the storage tank to another area of the storage tank. In the illustrated embodiment, the agitator moves the particulate material from the second sidewall 164 toward the first sidewall 162.

The camera sensor 180 may monitor the first level and the second level while the agitator is activated and may continue to output signal(s) to the controller indicative of the first level and the second level. The controller may determine when the difference between the first level and the second level is less than the level difference threshold value. After determining that the difference is less than the level difference threshold value, the controller may output a signal to the drive system indicative of instructions to stop moving the agitator.

As described herein, various embodiments of the particulate material agitation control system may use certain sensed and/or determined parameters to control the agitating system of the particulate material agitation control system. Additionally, in certain embodiments, the particulate material agitation control system may use data from the sensors disposed along the length of the hopper, the output amounts of individual meters of the metering system disposed below the hopper, data from the camera sensor disposed generally above the particulate material, or a combination thereof, to control the agitating system of the particulate material agitation control system.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A particulate material agitation control system, comprising:
a metering system comprising a first meter having a first inlet disposed at a first position of the metering system and a second meter having a second inlet disposed at a second position of the metering system; and
an agitation control system comprising:
an agitating system comprising at least one drive system connected to an agitator; and
a controller comprising a memory and a processor, wherein the controller is configured to:
determine a first output amount of particulate material at the first position;
determine a second output amount of the particulate material at the second position;
determine whether a difference between the first output amount and the second output amount is greater than an output difference threshold value; and
output an activation signal to the agitating system indicative of instructions to activate the at least one drive system in response to determining that the difference between the first output amount and the second output amount is greater than the output difference threshold value;
wherein the first and second inlets are positioned and configured for receiving particulate material that has passed through the agitation system.

2. The particulate material agitation control system of claim 1, wherein the activation signal is configured to induce the drive system to move the particulate material toward the first position or toward the second position.

3. The particulate material agitation control system of claim 1, wherein the activation signal is configured to induce the drive system to turn the agitator of the agitating system for a number of revolutions, an amount of time, or a combination thereof.

4. The particulate material agitation control system of claim 1, wherein the first meter comprises a first meter roller configured to move the particulate material through the first meter, and the second meter comprises a second meter roller configured to move the particulate material through the second meter.

5. The particulate material agitation control system of claim 4, comprising a first motor coupled to the first meter roller and a second motor coupled to the second meter roller, wherein the first motor is configured to control the first meter roller to control the first output amount, and the second motor is configured to control the second meter roller to control the second output amount.

6. The particulate material agitation control system of claim 1, wherein the controller is configured to automatically determine the output difference threshold value based on a type of particulate material, a size of the agitating system, or a combination thereof.

7. The particulate material agitation control system of claim 1, wherein the first position is at a first lateral end of the agitating system, the second position is at a second lateral end of the agitating system, and the first lateral end is opposite the second lateral end.

8. A particulate material agitation control system of claim 1, wherein the activation signal is configured to cause the agitator to move the particulate material in a first direction in response to determining that the second amount is greater than the first amount, and the activation signal causes the agitating system to move the particulate material in a second direction in response to determining that the first amount is greater than the second amount.

9. A particulate material agitation control system, comprising:
a storage tank comprising a first sidewall and a second sidewall;
a camera sensor; and
an agitation control system, comprising:
an agitating system comprising at least one drive system and at least one agitator; and
a controller comprising a memory and a processor, wherein the controller is configured to:
receive from the camera sensor a camera sensor signal indicative of a first level of particulate material at the first sidewall and a second level of the particulate material at the second sidewall;

determine whether a difference between the first level and the second level is greater than a level difference threshold value; and output an activation signal to the at least one drive system indicative of instructions to activate of the at least one agitator in response to determining that the difference between the first level and the second level is greater than the level difference threshold value wherein the activation signal is configured to cause the agitator to move the particulate material toward the first sidewall in response to determining that the second level is greater than the first level, and the activation signal causes the agitating system to move the particulate material toward the second sidewall in response to determining that the first level is greater than the second level.

10. The particulate material agitation control system of claim 9, wherein the camera sensor is disposed above the agitating system, wherein the controller is configured to receive the first camera sensor signal and the second camera sensor signal from the camera sensor.

11. The particulate material agitation control system of claim 9, wherein the first sidewall comprises a first set of markings, labels, stickers, or a combination thereof, the second sidewall comprises a second set of markings, labels, stickers, or a combination thereof, and the first set and the second set are configured to indicate the first level of the particulate material and the second level of the particulate material, respectively.

12. The particulate material agitation control system of claim 10, wherein the camera sensor signal comprises an image of the particulate material, the first sidewall, and the second sidewall.

13. The particulate material agitation control system of claim 10, wherein the camera sensor is configured to detect the first level and the second level based on a difference in color between the particulate material and the storage tank.

14. The particulate material agitation control system of claim 10, wherein the activation signal is configured to cause the agitator to move the particulate material until the difference between the first level and the second level is less than the level difference threshold value.

15. A particulate material agitation control system, comprising:
 a metering system comprising a plurality of meters;
 at least one of a tank or hopper; and
 an agitation control system comprising:
  an agitation system comprising an agitator and at least one drive system connected to the agitator; and
  a controller comprising a memory and a processor, wherein the controller is configured to:
   determine a measured profile in the at least one of a tank or hopper based on feedback from at least one sensor on a plurality of output amounts from respective meters of the plurality meters;
   determine whether a variation between the measured profile and a target profile is greater than a profile variation threshold value; and
   output an activation signal to the at least one drive system indicative of activation of the agitator in response to determining that the variation between the measured profile and the target profile is greater than the profile variation threshold value;
  wherein the plurality of meters are positioned and configured for receiving particulate material that has passed through the agitation system.

16. The particulate material agitation control system of claim 15, wherein the controller is configured to determine the output amount of each meter of the plurality of meters based on an activation, deactivation, rotation speed, or a combination thereof, of a metering device of each meter.

17. The particulate material agitation control system of claim 15, comprising a plurality of row units configured to receive the particulate material from the plurality of meters.

18. The particulate material agitation control system of claim 17, wherein the target profile is determined based on a geographical location of each row unit of the plurality of row units.

19. The particulate material agitation control system of claim 15, wherein the activation signal is configured to cause the agitator to move the particulate material in a first direction in response to determining that the profile is greater than the first amount, and the activation signal causes the agitating system to move the particulate material in a second direction in response to determining that the first amount is greater than the second amount.

* * * * *